United States Patent [19]

Kliment

[11] 3,930,076

[45] Dec. 30, 1975

[54] METHOD FOR PROVIDING DENTURES WITH A SOFT HYDROGEL LAYER

[76] Inventor: Karel Kliment, 321 Walnut Lane, Princeton, N.J. 08540

[22] Filed: July 13, 1973

[21] Appl. No.: 378,933

[52] U.S. Cl. ............... 427/353; 427/307; 427/372; 427/385; 428/520
[51] Int. Cl.² ...................... A61C 13/28; C08J 7/08
[58] Field of Search ............... 117/138.8 UA, 161 UZ, 161 UT, 117/161 UA, 63; 260/885; 32/2; 427/353, 385

[56] References Cited
UNITED STATES PATENTS

| | | | |
|---|---|---|---|
| 3,220,960 | 11/1965 | Wichterle et al. | 260/2.5 |
| 3,446,875 | 5/1969 | Bruckmann et al. | 260/885 |
| 3,496,254 | 2/1970 | Wichterle | 264/1 |
| 3,607,848 | 9/1971 | Stoy et al. | 260/86.1 |
| 3,618,213 | 11/1971 | Shepherd et al. | 32/2 |
| 3,628,988 | 12/1971 | Stol et al. | 117/63 |
| 3,758,448 | 9/1973 | Stamberger | 260/86.1 E |
| 3,822,089 | 7/1974 | Wichterle | 351/160 |

FOREIGN PATENTS OR APPLICATIONS

| | | |
|---|---|---|
| 857,032 | 12/1960 | United Kingdom |
| 7,033,426 | 10/1970 | Japan |

*Primary Examiner*—P. E. Willis, Jr.
*Attorney, Agent, or Firm*—Cushman, Darby & Cushman

[57] ABSTRACT

A hard acrylic denture has a soft hydrogel layer applied thereto in the form of a paste consisting essentially of hydrophilic monomer, active filler, preferably finely divided silica, and a suitable solvent, with or without a hydrophobic monomer. The composition is then polymerized in place to give a soft hydrogel layer with a more regular structure than that previously attained.

29 Claims, No Drawings

METHOD FOR PROVIDING DENTURES WITH A SOFT HYDROGEL LAYER

The present invention relates to the application of a permanent, soft hydrogel layer to a hard acrylic denture.

It has been previously known that poly(hydroxyethyl methacrylate) can be used advantageously as a permanently soft lining material for dentures. Thus, U.S. Pat. application Ser. No. 517,946 filed on Jan. 3, 1966 disclosed the use of a prepolymer of hydroxyethyl methacrylate, filled with an active filler (finely divided silica) to form a paste. This was spread on the denture and polymerized in situ, forming a layer of liner which in contact with water became permanently soft.

Further, development of this work is disclosed in Stol U.S. Pat. No. 3,628,988, issued Dec. 21, 1971 employing an inert, water soluble solvent in the prepolymer composition. Its incorporation brought about three advantages: (1) the adhesion to the poly(methyl methacrylate) base was better, (2) mechanical properties of the liner were improved, and (3) the excessive swelling in water was eliminated. Though this soft lining can be prepared from a prepolymer alone, solutions of poly(hydroxyethyl methacrylate) in the corresponding monomer were normally used. Preparation of the prepolymer, especially in bigger batches, is extremely difficult.

Preparation of the paste according to the Stol patent includes separate preparation of the soluble poly(hydroxyethyl methacrylate) in fine powder form and its subsequent dissolution in a monomer-solvent mixture.

It has now been found that a suitable denture liner can be prepared from a paste which contains neither prepolymer, nor a soluble polymer solution. Each of these ingredients was in the paste in the prior art primarily for the reason of raising the viscosity of the paste and giving it "body." By use of an appropriate amount of the active filler, a comparable viscosity of the final paste can be achieved without the use of any polymer and the denture liner can then be formed on any denture having a hard polymeric acrylic base, e.g., a base of polymerized methyl methacrylate. The entire disclosure of the Stol patent is hereby incorporated by reference. Other suitable hard polymeric acrylic bases are shown for example in Bruckmann, U.S. Pat. No. 3,468,977, the entire disclosure of which is also incorporated by reference.

The new formulation of the paste of the present invention provides several basic advantages. First, the preparation of the paste is cheaper and easier. For the old type of formulation, it was necessary to prepare the polymer in powder form and to dissolve it in the monomer-solvent mixture. Both of these steps are completely eliminated with the new formulation. The savings both on materials and on time represent between 25 to 35 percent of the total cost of the paste.

A second advantage lies in the more regular structure of the final polymer. It is known that during the polymerization of poly(hydroxyethyl methacrylate) in the presence of a crosslinking agent, the final polymer has areas of differing crosslinking density. If a solution of a polymer in a monomer is used, this situation worsens. The polymer already contains large sections of linear, branched or coiled macromolecules with a very low degree of crosslinking density. During the final polymerization of the polymer in a monomer solution, these sections are incorporated into the growing polymer chains and finally cross-linked with them once the gel-point is reached. The original polymer in the solution of monomer contains some pendant vinyl groups and so can participate to a certain degree in the crosslinking process. However, it is incorporated mostly into the final polymer by its end groups and hence its crosslinking density will be much less than in the polymer formed from the monomer. The irregular crosslinking density can adversely influence the mechanical properties of the final polymer in the swelled state. Additionally, during the swelling in water the final polymer goes through a stage of above equilibrium swelling, because of the presence of the solvent in the polymer. This solvent cannot get out of the polymer as quickly as the water is coming in and the polymer gets into an unsteady state. The solvent and/or water present in the polymer in excess of the equilibrium is slowly removed while the polymer is deswelling to the equilibrium value. During this period the excess solvent is usually separated inside the polymer in the form of microscopic droplets, causing turbidity. Depending on the homogeneity of the polymer, this turbidity is more or less pronounced. It has been found that polymers prepared from monomer and non-polymerizing solvent alone, without any polymer, do evidence less turbidity on swelling in water.

As an added bonus, the scope of comonomers usable according to the present invention is much broader than in the Stol U.S. Pat. No. 3,628,988. When a solution of polymer in monomer and solvent is used as in Stol, the comonomers are limited to those monomers whose polymers are still soluble in the hydroxyethyl methacrylate — solvent combination. Also, the comonomers must not precipitate the poly(hydroxyethyl methacrylate) if used as comonomers with hydroxyethyl methacrylate. This rules out, for example, lower hydrophobic aliphatic esters of methacrylic or acrylic acid. If no polymer is used and the paste contains only monomers and solvent, and active filler, no such limitations apply.

The composition employed for the preparation of permanently soft denture liners comprises:

1. hydrophilic monomer, or a mixture of hydrophilic monomers, or a combination of hydrophilic and hydrophobic monomers, preferably with a suitable crosslinking agent;
2. a suitable solvent, which is inert (non-toxic), water soluble and which is a good solvent for poly(methyl methacrylate) or the other hard acrylic polymer employed as the denture base;
3. an initiating system, consisting either of a suitable free radical polymerization initiator, or a combination of said initiator with an accelerator for room temperature polymerization, or using irradiation, etc.;
4. a polymerization inhibitor, to provide sufficient shelf stability of the product in the event the composition is to be stored prior to use; and
5. an active inert filler, and preferably a coloring agent.

Preferably the hydrophilic monomer used to prepare the hydrophilic polymer is a water soluble hydroxy lower alkyl monoacrylate or methacrylate, or a poly(lower alkoxy) lower alkyl acrylate or methacrylate, water soluble hydroxy lower alkoxy lower alkyl acrylate or methacrylate such as 2-hydroxyethylacrylate, 2-hydroxyethyl methacrylate, diethyleneglycol monoacrylate or monomethacrylate, hydroxypropyl acrylate or methacrylate, tetraethyleneglycol monomethacrylate, triethylene glycol monoacrylate or methacrylate, pentaethyleneglycol monomethacrylate, dipropyleneglycol monomethacrylate, dipropylene glycol monoacrylate, or similar hydrophilic monomers. The most preferred monomer is 2-hydroxyethyl methacrylate and the next most preferred monomer is 2-hydroxyethyl acrylate. Such hydrophilic monomers having the formula

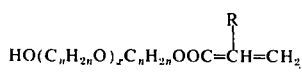

where R is hydrogen or methyl, n is 2 or 3 and x is 0 or a small whole number such as 1, 2, 3 or 4. Most preferably, n is 2 and x is 0 and R is methyl.

In addition to using polymers prepared from the hydrophilic monomers set forth above, it also has been found that compositions containing water insoluble hydrophilic copolymers can also be used in the invention. The term copolymers is employed generically to cover polymers of 2, 3, 4 or more copolymerizable reactants. Such copolymers include copolymers of hydroxyalkyl monoacrylates or methacrylates (or hydroxy alkoxyalkyl or hydroxy poly (alkoxy) alkyl acrylates or methacrylates) of the type set forth above, with 1 to 50 percent, preferably 5 to 25 percent, of alkyl acrylates and methacrylates such as methyl acrylate, ethyl acrylate, the propyl acrylates, e.g., n-propyl acrylate, isopropyl acrylate, the butyl acrylates, e.g., n-butyl acrylate or sec. butyl acrylate, methyl methacrylate, ethyl methacrylate, the propyl methacrylates, the butyl methacrylates, e.g., n-butyl methacrylate, and similar higher alkyl acrylates and methacrylates, e.g., octyl acrylate. The alkyl acrylate or methacrylate should not be used in an amount to destroy the hydrophilic nature of the polymer.

Other suitable copolymers include copolymers of the hydroxyalkyl acrylates or methacrylates (or hydroxyalkoxyalkyl or hydroxy poly(alkoxy)alkyl acrylates or methacrylates as set forth above with 1 to 60 percent, preferably 5 to 25 percent, of an alkoxy alkyl acrylate or methacrylate where the alkyl function has at least 2 carbon atoms, e.g., methoxyethyl acrylate, ethoxyethyl acrylate, propoxyethyl acrylate, butoxyethyl acrylate, methoxypropyl acrylate, methoxybutyl acrylate, methoxyethyl methacrylate, ethoxyethyl methacrylate, propoxyethyl methacrylate, butoxyethyl methacrylate, ethoxypropyl methacrylate, and similar higher alkoxy alkyl acrylates and methacrylates. Such compounds have the formula

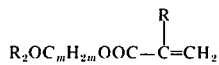

where $R_2$ is lower alkyl, m is an integer of at least 2, e.g., 2 to 4, and R is H or methyl.

There can also be employed copolymers of the hydroxyalkyl acrylates and methacrylates as set forth above with 0.1 to 25 percent, usually at least 1 percent, and preferably 5 to 15 percent, of hydrophilic monomers such as ethylenically unsaturated amines and amides. These include, for example, various alkylamino alkyl acrylates and methacrylates, various vinyl and alkyl vinyl pyridines, various dialkyl amino alkyl vinyl ethers, various acrylamides or methacrylamides, various vinyl pyrrolidones, and other similar ethylenically unsaturated amines. These materials should not be used in an amount to render the copolymer water soluble.

Typical examples of such copolymerizable hydrophilic amines and amides include diethylaminoethyl methacrylate, dimethyl aminoethyl methacrylate, monomethylaminoethyl methacrylate, t-butylaminoethyl methacrylate, p-aminostyrene, o-aminostyrene, 2-amino-4-vinyltoluene, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, 2-vinyl pyridine, 3-vinyl pyridine, 4-vinyl pyridine, 2-ethyl-5-vinyl pyridine, dimethylaminopropyl acrylate, dimethylamino propyl methacrylate, dipropylaminoethyl acrylate, dimethylaminoethyl vinyl ether, dimethylaminoethyl vinyl sulfide, diethylaminoethyl vinyl ether, aminoethyl vinyl ether, 2-pyrrolidinoethyl methacrylate, 3-(dimethylaminoethyl)-2-hydroxypropyl acrylate, 3-(dimethylaminoethyl)-2-hydroxypropyl methacrylate, 2-aminoethyl acrylate, 2-aminoethyl methacrylate, acrylamide, methacrylamide, N-isopropyl methacrylamide, N-methyl acrylamide, N-methyl methacrylamide, N-(2-hydroxyethyl) acrylamide, N-(2-hydroxyethyl) methacrylamide, N,N-diisopropyl acrylamide, N,N-dipropylacrylamide, N,N-diisopropyl methacrylamide.

Furthermore, there can be employed copolymers of the hydroxyalkyl (or hydroxyalkoxy or hydroxy poly-(alkoxy) alkyl) acrylates and methacrylates as set forth above with 0.1 to 15 percent, usually at least 1 percent, and preferably 5 to 15 percent of ethylenically unsaturated carboxylic acids or the anhydrides thereof. These include, for example, acrylic acid, methacrylic acid, fumaric acid, itaconic acid, aconitic acid, cinnamic acid, crotonic acid, maleic acid, maleic anhydride, hydroxy lower alkyl partial esters of ethylenically unsaturated polycarboxylic acids, e.g., mono-, di-, and tricarboxylic acids such as mono 2-hydroxypropyl itaconate, mono 2-hydroxyethyl itaconate, mono 2-hydroxyethyl citraconate, mono-2-hydroxypropyl aconitate, mono 2-hydroxyethyl maleate, mono-2-hydroxypropyl fumarate, monomethyl itaconate, monoethyl itaconate, mono Methyl Cellosolve ester of itaconic acid (methyl Cellosolve is the monomethyl ether of diethylene glycol), mono Methyl Cellosolve ester of maleic acid.

There can also be used sulfoalkyl and sulfoalkylamide acrylates and methacrylates in the amounts previously mentioned for the vinyl pyridines. Examples of such sulfo compounds are sulfoethyl acrylate (HO-SO$_2$CH$_2$CH$_2$OOCCH=CH$_2$), sulfoethyl methacrylate, sulfopropylacrylate, sulfopropyl methacrylate, sulfoethylacrylamide (HOSO$_2$CH$_2$CH$_2$NHCOCH=CH$_2$), sulfoethyl methacrylamide, sulfopropyl acrylamide and sulfopropyl methacrylamide.

In making the above mentioned polymers there can also be included a crosslinking agent, normally in an amount of 0.05 to 20 percent and preferably 0.1 to 2 percent. The cross linking favorably influences the mechanical properties, swelling and chemical resistance of the final polymer. Typical examples of crosslinking agents include ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol diacrylate, divinyl benzene, divinyl toluene, diallyl tartrate, allyl pyruvate, allyl maleate, divinyl tartrate, triallyl melamine, N,N'-methylene-bis-acrylamide, glycerine trimethacrylate, diallyl maleate, divinyl ether, diallyl mono ethylene glycol citrate, ethylene glycol vinyl allyl citrate, allyl vinyl maleate, diallyl itaconate, ethylene glycol diester of itaconic acid, divinyl sulfone, hexahydro-1,3,5-triacryltriazine triallyl phosphite, diallyl ester of benzene phosphonic acid, polyester of maleic anhydride with triethylene glycol, polyallyl sucrose, polyallyl glucose, e.g., diallyl sucrose and triallyl glucose, sucrose diacrylate, glucose dimethacrylate, pentaerythritol diacrylate, sorbitol dimethacrylate. As the cross-linking agent there can be used an ethylenically unsaturated carboxylic acid or a hydroxy lower alkyl partial ester of an ethylenically unsaturated polycarboxylic acid.

The most suitable cross-linking agents are diacrylates and dimethacrylates of the formula

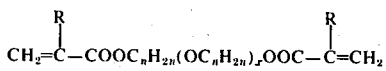

where $n$, $x$ and R are as defined above. Most preferably, $n$ is 2, $x$ is 0 and R is methyl. Additional examples where $x$ is 1, 2 or 3 include diethylene glycol diacrylate, diethylene glycol dimethacrylate, triethylene glycol diacrylate, triethylene glycol dimethacrylate, tetraethylene glycol diacrylate, tetraethylene glycol dimethacrylate. Commercial hydroxyalkyl acrylates and methacrylates normally contain 0.1–0.2 percent of the corresponding diacrylate or dimethacrylate and this need not be removed.

The practical amount of the monomer or monomers in the final formulation is between 50 and 97 weight percent, preferably between 65 and 80 weight percent.

The solvents suitable for use in the present invention are the same as specified in the Stol U.S. Pat. No. 3,628,988. The practical amount in the final formulation is between 0 and 40 weight percent, usually at least 1 percent or more normally at least 5 percent, preferably between 12 and 25 weight percent. Examples of such solvents include glycerol monoacetate, glycerol diacetate (diacetin), propylene glycol, Cellosolves (e.g., methoxyethanol and ethoxyethanol), 1,2 propanediolcarbonate, ethylene carbonate, dipropylene glycol, methoxyethoxyethanol, ethoxyethoxyethanol, butanol, pentanol, diethylene glycol, triethylene glycol, 1,4-butylene glycol, ethylene glycol monoacetate, t-butanol, ethylene glycol, ethanol, methanol, tetrahydrofurfuryl alcohol, and allyl alcohol. There can also be used mixtures of such solvents with up to 60 percent (based on the total composition) of glycerol or pentaerythritol.

Among others there can be used as solvents an alkanol having 1 to 4 carbon atoms, a glycol or glycerine partial acetate ester, acetic acid, a lower alkylene glycol, a lower alkoxy lower alkanol, a poly (lower alkoxy) lower alkanol and propylene carbonate.

The initiating system and the inhibitor can be chosen between the wide variety of compounds available today. Both their type and amount will be apparent to anyone versed in the art. Polymerization can also be carried out using other conventional methods, e.g., irradiation with gamma rays or ultraviolet light or with high energy electrons.

Examples of initiators include t-butyl peroctoate, benzoyl peroxide, isopropyl percarbonate, methyl ethyl ketone peroxide, cumene hyproperoxide, dicumyl peroxide, peracetic acid, azo-bis-isobutyronitrile, persulfates, e.g., ammonium persulfate and potassium persulfate. If a reducing agent is employed there can be used conventional materials such as diethylamino ethyl acetate, dimethyl aniline or p-toluene sulfinic acid. The amount of catalyst is not critical and can be that conventionally used in the art, e.g., 0.05 – 1 percent, usually 0.1 – 0.2 percent based on the total monomers.

The temperature of polymerization is not critical, e.g., temperatures of 10° to 150° C. Of course, the temperature should not be above the softening point of the hard acrylic resin base.

It was found that the best active, inert filler is finely divided silica (for example, Aerosil Type 380, Degussa, a colloidal silica) in the amount between 3 and 10 weight percent, preferably between 6 and 8 weight percent. Nevertheless, other suitable finely divided inert fillers, both inorganic and organic, can be used such as hydrated alumina, diatomaceous earth, bentonite clay, talc, fuller's earth, calcium carbonate, powdered glass, powdered quartz, crosslinked, insoluble hydroxy lower alkyl monoacrylate or monomethlacrylate polymers, and the like. The filler desirably has a particle size of 0.1–100 microns. Aerosil 380 has a particle size in this range.

As material for the hard skeleton of the artificial dentures the usual polymethylmethacrylate was mentioned. The method according to this invention may be, however, used in the same way for dentures manufactured from other polymers or copolymers such as ethyl methacrylate, methyl acrylate, benzyl methacrylate and similar hard acrylic polymers.

The preparation of the paste is very simple. The components are mixed together and filled into tubes or other suitable containers. As compared with the old process, the time consuming dissolution of the polymer in the monomersolvent mixture is eliminated.

Unless otherwise indicated all parts and percentages are by weight.

EXAMPLE 1

73.86 parts of hydroxyethyl methacrylate (medical grade), 0.34 parts of ethyleneglycol dimethacrylate, 0.13 parts of dibenzoyl peroxide (polymerization initiator), 0.07 parts of 2,2'-methylene bis-4-methyl-6-t-butyl phenol (polymerization inhibitor), 0.03 parts of red color (DC No. 30 Red Lake K 7156, Atlas colors) and 18.57 parts of glycerol diacetate (food grade) were mixed together thoroughly. Into the solution 7 parts of finely divided silica (Aerosil Type 380, Degussa) were slowly mixed until a smooth paste resulted.

The paste was deaerated by mixing in a vacuum and filled into polyethylene tubes, 14 g per tube.

A denture was prepared, following the conventional procedure, in a plaster mold from polymethyl methacrylate and liquid methyl methacrylate monomer with dibenzoyl peroxide catalyst as set forth in Example 1 of Stol U.S. Pat. No. 3,628,988. Before packing a denture, a shim or spacer from an even thickness of base plate wax was adapted to the flasked model. Using a polyethylene sheet, the denture was trial packed with cold cure denture base resin. The resin was cured at room temperature under the press for the time prescribed by the manufacturer of the cold cure resin to form the hard polymethyl methacrylate denture base.

After the cure, the flask was opened and the shim removed. The model was painted with a liquid separator (release agent) to obtain a shiny surface. A suitable plastic foil also can be used as the separator.

The hydrophilic liner was applied by squeezing the contents of the polyethylene tube onto the cured denture base. By lightly tapping the flask on the table's surface, an even flow of the paste and elimination of air bubbles can be achieved. The flask was closed in a bench press, placed in a conventional spring compress and put into boiling water for three hours to polymerize.

After the polymerization was completed, the flask was taken out of the water bath and bench cooled completely. Upon deflasking, the denture with the polymerized hydrophilic layer thereon was processed the usual way and put into water to swell the hydrophilic layer.

A slight turbidity developed in the hydrophilic layer during the first 36 hours of water immersion. Afterwards, the layer remained soft and clear when kept in water.

A hydrophilic layer, prepared in an identical way from a paste including hydroxyethyl methacrylate polymer, turned cloudy or white on swelling in water.

EXAMPLE 2

The hydrophilic liner paste was prepared as in Example 1, only instead of pure hydroxyethyl methacrylate the following monomer mixtures were used:

a. 90 parts hydroxyethyl methacrylate, 10 parts methyl methacrylate
b. 85 parts hydroxyethyl methacrylate, 15 parts butyl acrylate
c. 95 parts hydroxyethyl methacrylate, 5 parts N-vinyl pyrrolidone
d. 70 parts hydroxyethyl methacrylate, 30 parts ethoxyethylmethacrylate

EXAMPLE 3

The hydrophilic liner paste was prepared as in Example 1, only instead of ethyleneglycol dimethacrylate the following crosslinking agents were used in the same amount:

a. diethyleneglycol dimethacrylate
b. trimethyleneglycol dimethacrylate
c. decanediol dimethacrylate
d. pentaerythritol triacrylate
e. pentaerythritol tetramethacrylate

EXAMPLE 4

The hydrophilic liner paste was prepared as in Example 1, only instead of glycerol diacetate the following solvents were used in the same amount:

a. ethylene glycol
b. propyleneglycol

EXAMPLE 5

The hydrophilic liner paste was prepared as in Example 1. The ratio of hydroxyethyl methacrylate to glycerol diacetate, which in Example 1 is 8:2, was changed to the following ratios:

a. 9:1
b. 7:3
c. 7.5:2.5
d. 6:4

All the other components remained unchanged.

What is claimed is:

1. A method of providing dentures having a hard polymeric acrylic base with a soft hydrogel layer comprising the steps of:
   preparing a paste consisting essentially of:
   1a. a liquid hydrophilic monomer of the formula

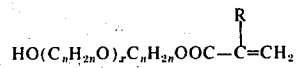

where R is H or methyl, $n$ is 2 or 3 and $x$ is 0 or an integer up to 4; or
   1b. a mixture of (a) with a copolymerizable ethylenically unsaturated monomer, said copolymerizable monomer being present in an amount insufficient to render the polymer formed either water soluble or hydrophobic;
   2. an anhydrous water soluble solvent capable of dissolving said hard polymeric acrylic base but not the soft hydrogel; and
   3. a finely divided inert filler;
   applying said paste to the hard polymeric acrylic base; and
   polymerizing said paste to form a hydrophilic polymer coating on said base.

2. A process according to claim 1 wherein the copolymerizable ethylenically unsaturated monomer is a cross-linking agent, an alkoxy compound of the formula

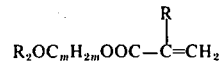

where $R_2$ is lower alkyl, $m$ is an integer of 2 to 4 and R is H or methyl, a water solubilizing ethylenically unsaturated amine, carboxylic acid, amide sulfoalkyl acrylate, sulfoalkyl methacrylate, vinyl pyrrolidone, a hydroxy lower alkyl partial ester of an ethylenically unsaturated polycarboxylic acid, an alkyl acrylate or an alkyl methacrylate.

3. A process according to claim 2 wherein the filler is silica, alumina, diatomaceous earth, bentonite clay, talc, fuller's earth, glass, quartz or calcium carbonate.

4. A process according to claim 1 including the step of removing said solvent after the hydrophilic polymer coating is formed on said base and replacing it with water to form said soft hydrogel layer.

5. A process according to claim 4 wherein the solvent contains at least one alcoholic hydroxyl group.

6. A process according to claim 4 wherein the solvent is an alkanol having 1 to 4 carbon atoms, a glycol or glycerine partial acetate ester, acetic acid, a lower alkylene glycol, a lower alkoxy lower alkanol, a poly(lower alkoxy) lower alkanol, glycerine, pentaerythritol, tetrahydrofurfuryl alcohol, allyl alcohol, ethylene carbonate, and propylene carbonate.

7. A process according to claim 4 wherein (1) is present in an amount of 50 to 97 percent, (2) is present in an amount up to 40 percent, and (3) is present in an amount of 3 to 10 percent.

8. A process according to claim 7 wherein polymerization is carried out with a polymerization initiator under free radical polymerization conditions.

9. A process according to claim 7 wherein the filler is silica, alumina, diatomaceous earth, bentonite clay, talc, fuller's earth, glass, quartz or calcium carbonate.

10. A process according to claim 9 wherein the filler is silica.

11. A process according to claim 10 wherein (1) is present in an amount of 65 to 80 percent and (2) is present in an amount of 12 to 25 percent.

12. A process according to claim 11 wherein (3) is present in an amount of 6 to 8 percent.

13. A process according to claim 11 where R is methyl, $n$ is 2 and $x$ is 0.

14. A process according to claim 4 wherein (1) is (b) and the copolymerizable monomer includes 0.05 to 20 percent of a cross-linking agent based on the total of polymerizable monomers.

15. A process according to claim 14 wherein the cross-linking agent has the formula

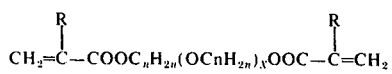

where R is H or methyl, $n$ is 2 or 3 and $x$ is 0 or an integer up to 4.

16. A process according to claim 15 wherein the x group are zero.

17. A process according to claim 16 wherein all the n's are 2 and all the R groups are methyl.

18. A process according to claim 14 wherein the copolymerizable monomers include 1 to 60 percent based on the total monomers of an alkoxy compound of the formula

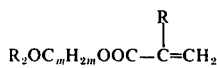

where $R_2$ is lower alkyl, $m$ is an integer of 2 to 4, and R is H or methyl.

19. A process according to claim 18 wherein the alkoxy compound is present in an amount of 5 to 25 percent, $R_2$ is alkyl of 1 to 4 carbon atoms and $m$ is 2 or 3.

20. A process according to claim 14 wherein the copolymerizable monomer additionally includes an alkoxy compound

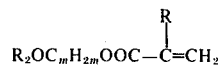

where $R_2$ is lower alkyl, $m$ is an integer of 2 to 4 and R is H or methyl, a water solubilizing ethylenically unsaturated amine, carboxylic acid, amide, sulfoalkyl acrylate, sulfoalkyl methacrylate, vinyl pyrrolidone, a hydroxy lower alkyl partial ester of an ethylenically unsaturated polycarboxylic acid, an alkyl acrylate or an alkyl methacrylate.

21. A process according to claim 14 wherein the copolymerizable monomers include 0.1 to 25 percent based on the total monomers of a water solubilizing ethylenically unsaturated amine, carboxylic acid, amide, sulfoalkyl acrylate or methacrylate, or vinyl pyrrolidone.

22. A process according to claim 21 wherein there is present 5 to 15 percent of said water solubilizing compound.

23. A process according to claim 14 additionally including 0.1 to 15 percent based on the total monomers of an ethylenically unsaturated carboxylic acid or a hydroxy lower alkyl partial ester of an ethylenically unsaturated polycarboxylic acid.

24. A process according to claim 14 additionally including 1 to 25 percent based on the total monomers of an alkyl acrylate or methacrylate.

25. A process according to claim 14 wherein (1) is a mixture of hydroxyethyl methacrylate and ethylene glycol dimethacrylate.

26. A process according to claim 14 wherein the solvent is glycerol monoacetate or glycerol diacetate.

27. A process according to claim 25 wherein the inert filler is finely divided silica.

28. A hard polymeric acrylic denture base having an outer coating of a soft hydrophilic polymer hydrogel layer prepared by the process of claim 27.

29. A hard polymeric acrylic denture base having an outer coating of a soft hydrophilic polymer hydrogel layer prepared by the process of claim 4.

* * * * *